(12) United States Patent
Sim et al.

(10) Patent No.: US 7,020,194 B2
(45) Date of Patent: Mar. 28, 2006

(54) APPARATUS AND METHOD FOR VECTOR DESCRIPTOR REPRESENTATION AND MULTIMEDIA DATA RETRIEVAL

(75) Inventors: Dong Gyu Sim, Inchon (KR); Hae Kwang Kim, Seoul (KR); Mun Churl Kim, Daejun (KR); Jin Woong Kim, Daejun (KR)

(73) Assignees: Hyundai Electronics Ind. Co., Ltd., Kyungki-do (KR); Telecommunications Research Institute, Daejun (KR)

( * ) Notice: Subject to any disclaimer, the term of this patent is extended or adjusted under 35 U.S.C. 154(b) by 1096 days.

(21) Appl. No.: 09/808,627

(22) Filed: Mar. 14, 2001

(65) Prior Publication Data

US 2001/0025283 A1    Sep. 27, 2001

(30) Foreign Application Priority Data

Mar. 18, 2000   (KR) ............................... 2000-13816

(51) Int. Cl.
*H04B 1/66* (2006.01)

(52) U.S. Cl. .............................. 375/240.03; 375/240.2; 375/240.23; 375/240.08; 375/240.22; 375/240.25; 375/240.26; 382/233; 382/235; 382/246; 382/250; 382/251; 382/253

(58) Field of Classification Search ........... 375/240.03, 375/240.2, 240.23, 240.08, 240.22, 240.25, 375/240.26; 382/233, 235, 246, 250, 251, 382/253
See application file for complete search history.

(56) References Cited

U.S. PATENT DOCUMENTS

| | | | |
|---|---|---|---|
| 5,668,600 A | * | 9/1997 | Lee ........................ 375/240.16 |
| 5,713,021 A | | 1/1998 | Kondo et al. ................ 395/614 |
| 5,745,700 A | | 4/1998 | Caci ....................... 395/200.77 |
| 5,813,014 A | | 9/1998 | Gustman ..................... 707/103 |
| 5,859,932 A | * | 1/1999 | Etoh ........................... 382/253 |
| 5,873,080 A | | 2/1999 | Coden et al. ................... 707/3 |
| 6,169,766 B1 | * | 1/2001 | Aoki et al. ............. 375/240.16 |

* cited by examiner

*Primary Examiner*—Shawn S. An
(74) *Attorney, Agent, or Firm*—Baker Botts LLP; Bradley B. Geist; Manu J. Tejwani

(57) ABSTRACT

The present invention relates to an apparatus and a method for vector descriptor representation and multimedia data retrieval, which can quantize a plurality of feature values described by a vector descriptor respectively, represent the quantized feature values in the form of bit or orthogonally transform the quantized bector feature values, and rearrange the feature values represented in the form of bit from the highest bit to the lowest bit or rearrange the transformed coefficient from low frequency to high frequency to represent the vector descriptor hierarchically. Moreover, when retrieving multimedia data, the present invention can code in variable length and store the rearranged feature values and the number of feature values which are input, inversely code only the feature values corresponding to the number of the feature values of the stored feature values, inversely arrange the inversely coded feature values to be restored to original feature values, inversely quantize the restored feature values, and compare the feature values restored by the inverse quantization with the feature values stored in a multimedia database to retrieve multimedia data.

22 Claims, 9 Drawing Sheets

APPARATUS AND METHOD FOR VECTOR DESCRIPTOR REPRESENTATION AND MULTIMEDIA DATA RETRIEVAL

BACKGROUND OF THE INVENTION

1. Field of the Invention

The present invention relates to an apparatus and a method for vector descriptor representation and multimedia data retrieval, and more particularly to, an apparatus and a method for vector descriptor representation and multimedia data retrieval, which can hieratically represent and store vector descriptor of multimedia data and retrieve multimedia data using the stored representation information.

2. Description of the Related Art

Recently, it has brought out the problem to retrieve and store multimedia data because of bulky multimedia data. Moreover, a demand not for text-based retrieval but for content-based retrieval is being increased to retrieve the bulky multimedia data fast and as a user wants. To solve the problems, attempts to represent descriptors of multimedia information and correlation between the descriptors of multimedia information have been continued.

For example, multimedia data consists of image and sound, and image consists of various objects: each of them having features of color, shape and texture; and a group of images having a motion feature. If the images are stored only in themselves, there is difficulty to retrieve.

To solve the above problem, a method for effectively representing each object or representation unit has been proposed. Especially, in case that several descriptors are represented in the form of vector, stable retrieval result cannot be obtained if the retrieval is performed in the state that several elements of vector are omitted, because vectors have different meanings respectively.

Moreover, if vector descriptors are all stored to tremendous multimedia data in construction of database, large storing space may be wasted according to circumstances. Furthermore, several users may want to maintain only small descriptor metafile.

However, as described above, because several feature values cannot be omitted from the vector descriptors, there is a problem that data cannot be represented as a flexible amount.

FIG. 1 shows a block diagram of a conventional vector descriptor representing apparatus.

As shown in FIG. 1, the conventional vector descriptor representing apparatus includes a quantization unit 400 for quantizing a great deal of feature values described by vector descriptor and a variable-length coding unit 401 for coding each feature value quantized in the quantization unit 400 in variable length and storing the coded feature values in a feature value storing unit 402.

FIG. 2 shows a block diagram of a multimedia data retrieval device using the conventional vector descriptor representing apparatus.

As shown in FIG. 2, the multimedia data retrieval device using the conventional vector descriptor representing apparatus includes a variable-length inversely coding unit 502 for inversely coding the coded feature values in variable length, an inverse quantization unit 503 for inversely quantizing the feature values inversely coded in the variable-length inversely coding unit 502 and restoring the inversely coded feature values to original feature value, and a comparing unit 505 for comparing the original feature value restored by the inverse quantization unit 503 with multimedia data stored in a multimedia database 504 and retrieving multimedia data according to the compared result.

The operation of the conventional vector descriptor representing apparatus and multimedia data retrieval device using it will be described in more detail as follows.

First, the vector descriptor (X) in the conventional vector descriptor representing apparatus shown in FIG. 1 can be formularized as follows:

$$\langle MARGIN \rangle \langle TR \rangle \langle P \rangle X = \begin{bmatrix} X_1 \\ \langle IP \rangle \langle P \rangle X_2 \\ \langle IP \rangle \langle P \rangle \cdot \\ \langle IP \rangle \langle P \rangle X_N \end{bmatrix} \langle IP \rangle, \quad \text{Formula 1}$$

wherein X is the vector descriptor consisting of first to Nth feature values ($X_1, \ldots$ and $X_N$).

To represent the vector descriptor (X), the quantization unit 400 quantizes the first to Nth feature values ($X_1, \ldots$ and $X_N$) constituting the vector descriptor (X) and provides to the variable-length coding unit 401. The variable-length coding unit 401 codes the first to Nth feature values ($X_1, \ldots$ and $X_N$) quantized by the quantization unit 400 in variable length and stores the coded feature values in the storing unit 402.

Next, the operation of the multimedia data retrieval device using the conventional vector descriptor representing apparatus shown in FIG. 2 will be described in more detail as follows.

The variable-length inversely coding unit 502 inversely codes the coded feature values in variable length and provides to the inverse quantization unit 503.

The inverse quantization unit 503 inversely quantizes the feature values provided from the variable-length inversely coding unit 502 and provides to the comparing unit 505.

The comparing unit 505 compares the feature values provided from the inverse quantization unit 503 with multimedia data stored in the multimedia database 504 and outputs retrieval data according to the compared result.

As previously described, the conventional multimedia data retrieval device retrieves multimedia data using the feature values of the vector descriptor represented by the vector descriptor representing device.

However, as previously described, in the conventional vector descriptor representing device, when data is represented, because it is difficult to determine importance of the first to Nth feature values ($X_1, \ldots$ and $X_N$) of the vector descriptor (X), there is a problem that cannot represent multimedia data by a small amount of data.

Furthermore, also in the multimedia data retrieval device using the conventional vector descriptor representing apparatus, because it is difficult to determine importance of the first to Nth feature values ($X_1, \ldots$ and $X_N$) of the vector descriptor (X), there is a problem that cannot represent multimedia data by a small amount of data.

SUMMARY OF THE INVENTION

It is, therefore, an object of the present invention to provide an apparatus and a method for vector descriptor representation and multimedia data retrieval, which can represent and rearrange a plurality of feature values constituting vector descriptor of multimedia data in the form of bit, represent and store the vector descriptor hierarchically according to the number of the feature values, and retrieve multimedia data using the stored representation information.

It is another object of the present invention to provide an apparatus and a method for vector descriptor representation and multimedia data retrieval, which can orthogonally transform a plurality of feature values constituting vector descriptor of multimedia data, represent and store the vector descriptor hierarchically according to the number of the feature values, and retrieve multimedia data using the stored representation information.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 1:
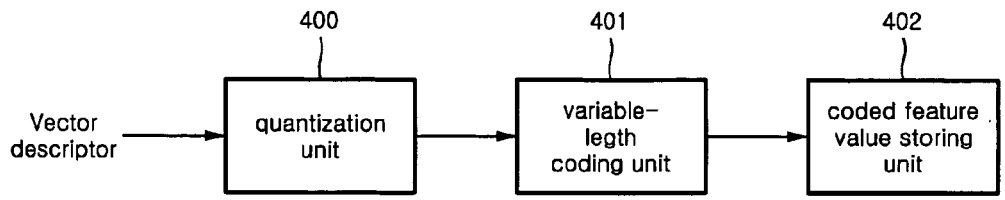
FIG. 1 is a block diagram of a conventional vector descriptor representing apparatus.
Figure 2:
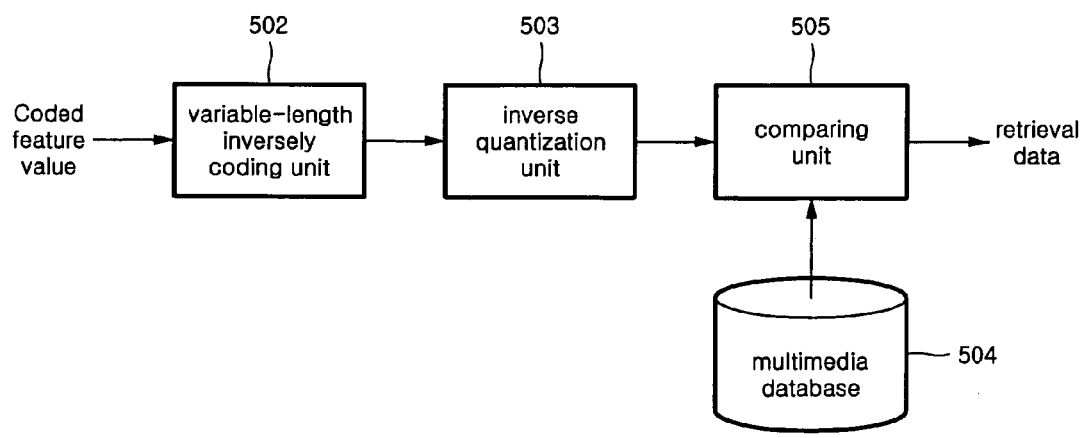
FIG. 2 is a block diagram of a multimedia data retrieval device using the conventional vector descriptor representing apparatus.

The present invention will now be described in detail in connection with preferred embodiments with reference to the accompanying drawings. For reference, like reference characters designate corresponding parts throughout several views.

Figure 3:
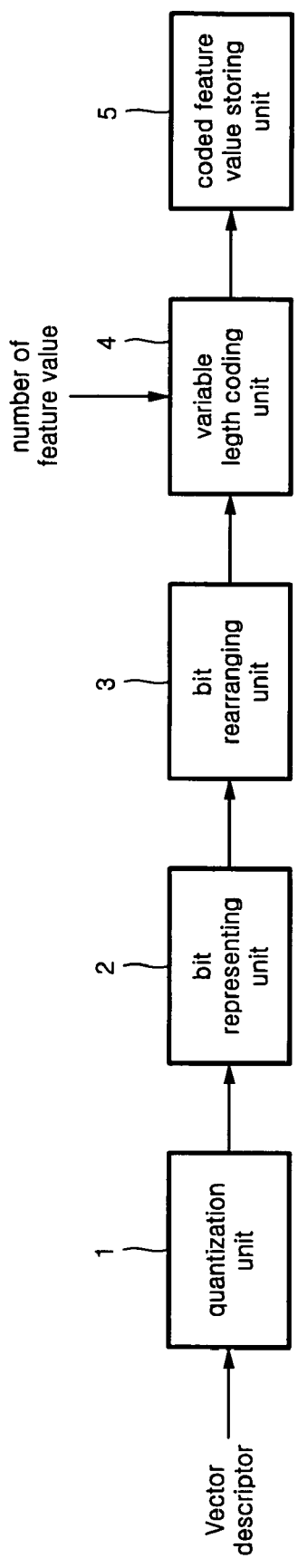
FIG. 3 is a block diagram of a preferred embodiment of a vector descriptor representing apparatus according to the present invention.

FIG. 3 shows a structure of a vector descriptor representing apparatus according to a preferred embodiment of the present invention.

As shown in FIG. 3, the vector descriptor representing apparatus according to a preferred embodiment of the present invention includes a quantization unit 1 for quantizing a great deal of feature values of the vector descriptor respectively, a bit representing unit 2 for representing each feature value quantized in the quantization unit 1 in the form of bit, a bit rearranging unit 3 for rearranging each feature value represented in the bit representing unit 2, and a variable-length coding unit 4 for coding the feature values rearranged in the bit rearranging unit 3 in variable-length and storing the coded feature values in a feature value storing unit 5 or for coding the feature values rearranged in the bit rearranging unit 3 and the number of feature values which are input and storing the coded feature values in the feature value storing unit 5.

Figure 7:
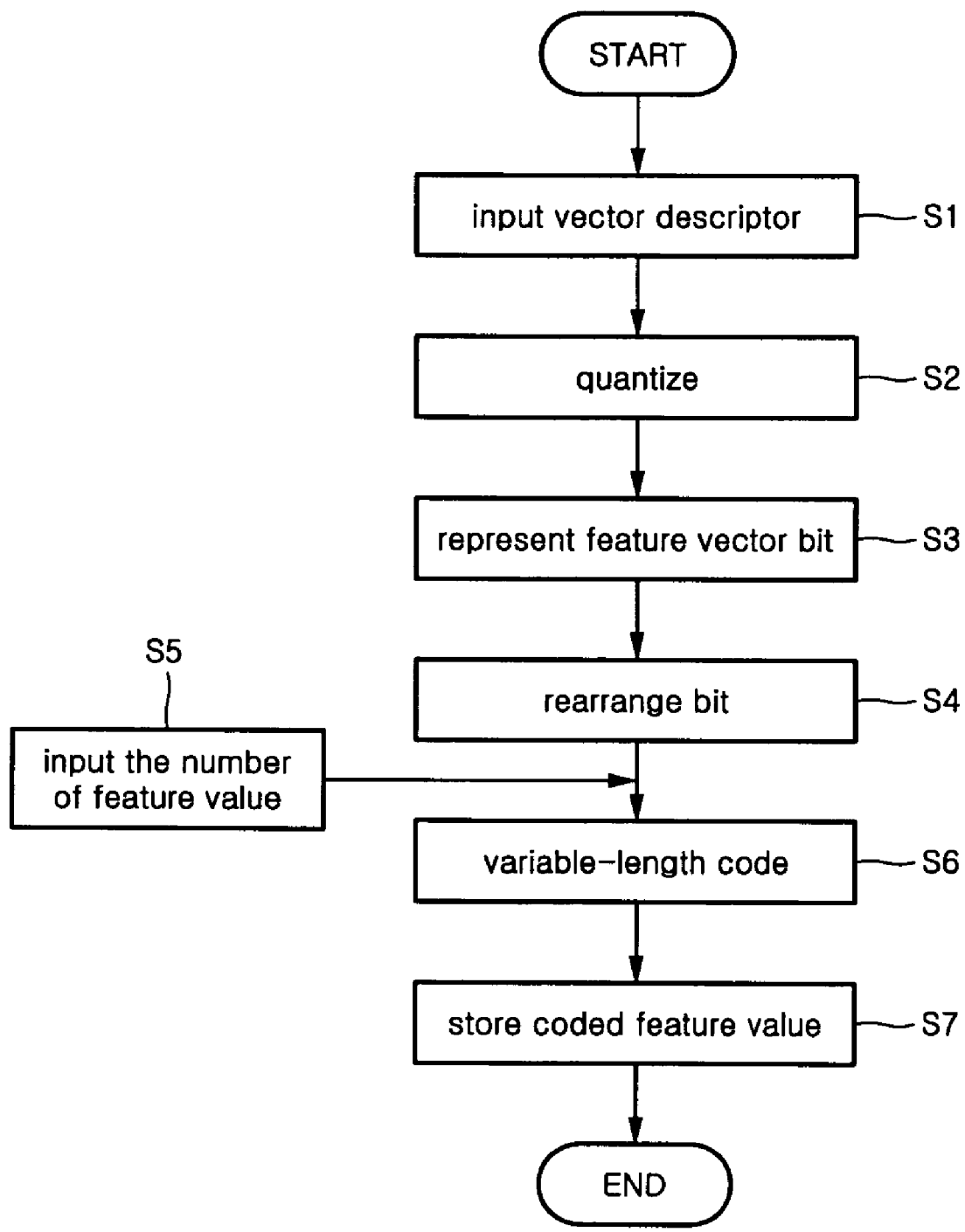
FIG. 7 is a flow chart showing a preferred embodiment of a method for representing vector descriptor according to the present invention.

Referring to FIG. 7, the operation of the vector descriptor representing apparatus according to the present invention will be described in more detail as follows.

First, in a step S1, if the vector descriptor consisting of first to Nth feature values $(X_1, \ldots \text{ and } X_N)$ is input in the quantization unit 1, the quantization unit 1 quantizes the first to Nth feature values $(X_1, \ldots \text{ and } X_N)$ in a step S2.

In a step S3, the bit representing unit 2 represents the first to Nth feature values $(X_1, \ldots \text{ and } X_N)$ quantized in the quantization unit 1 in the form of bit as shown in the following formula 2:

$$X = \begin{bmatrix} X_1 \\ X_2 \\ \cdot \\ X_N \end{bmatrix} \qquad \text{Formula 2}$$

-continued $$= P \geq \begin{bmatrix} X_1^{MI-1}, X_1^{MI-2}, \ldots X_1^0 \\ \langle IP \rangle \langle P \rangle X_2^{M2-1}, X_2^{M2-2} \ldots X_2^0 \\ \langle IP \rangle \langle P \rangle \ldots \\ \langle IP \rangle \langle P \rangle X_N^{MN-1}, X_N^{MN-2} \ldots X_N^0 \end{bmatrix} \langle IP \rangle,$$

wherein X is the vector descriptor consisting of the first to Nth feature values ($X_1, \ldots$ and $X_N$), and $X_N^K$ is Kth bit when Nth feature value ($X_N$) is represented by binary number.

Next, in a step S4, the bit rearranging unit 3 rearranges the first to Nth feature values ($X_1, \ldots$ and $X_N$) represented like the above formula 2 in the bit representing unit 2 as hierarchical or progressive vector descriptor (Y) as shown in the following formula 3:

Formula 3

$$\langle MARGIN \rangle \langle TR \rangle \langle P \rangle Y = \begin{bmatrix} Y_1 \\ \langle IP \rangle \langle P \rangle Y_2 \\ \langle IP \rangle \langle P \rangle \cdot \\ \langle IP \rangle \langle P \rangle Y_{\max(MI,\ldots,MN)-1} \end{bmatrix} \langle IP \rangle \langle P \rangle \langle IP \rangle$$

$$= P \geq \begin{bmatrix} X_1^{MI-1}, X_1^{MI-2}, \ldots X_1^0 \\ \langle IP \rangle \langle P \rangle X_2^{M2-1}, X_2^{M2-2} \ldots X_2^0 \\ \langle IP \rangle \langle P \rangle \ldots \\ \langle IP \rangle \langle P \rangle X_N^{MN-1}, X_N^{MN-2} \ldots X_N^0 \end{bmatrix} \langle IP \rangle$$

By being rearranged by the bit rearranging unit 3, the first feature value ($Y_1$) in the hierarchical vector descriptor (Y) is a representative feature value of the vector descriptor (X).

Like the above, the number of the feature values ($Y_1, Y_2, \ldots$) in the hierarchical vector descriptor (Y) is increased to become similar with the vector descriptor (X).

To store the plural feature values ($Y_1, Y_2, \ldots$) of the hierarchical vector descriptor (Y) rearranged by the bit rearranging unit 3, in steps S6 and S7, the variable-length coding unit 4 codes each of the feature values ($Y_1, Y_2, \ldots$) in variable length and stores the coded feature values in the feature value storing unit 5.

Moreover, in the steps of S6 and S7, the variable-length coding unit 4 codes each feature values rearranged in the bit rearranging unit 3 and the number of feature values input in the step S5 and stores the coded feature values in the storing unit 5.

Figure 4:
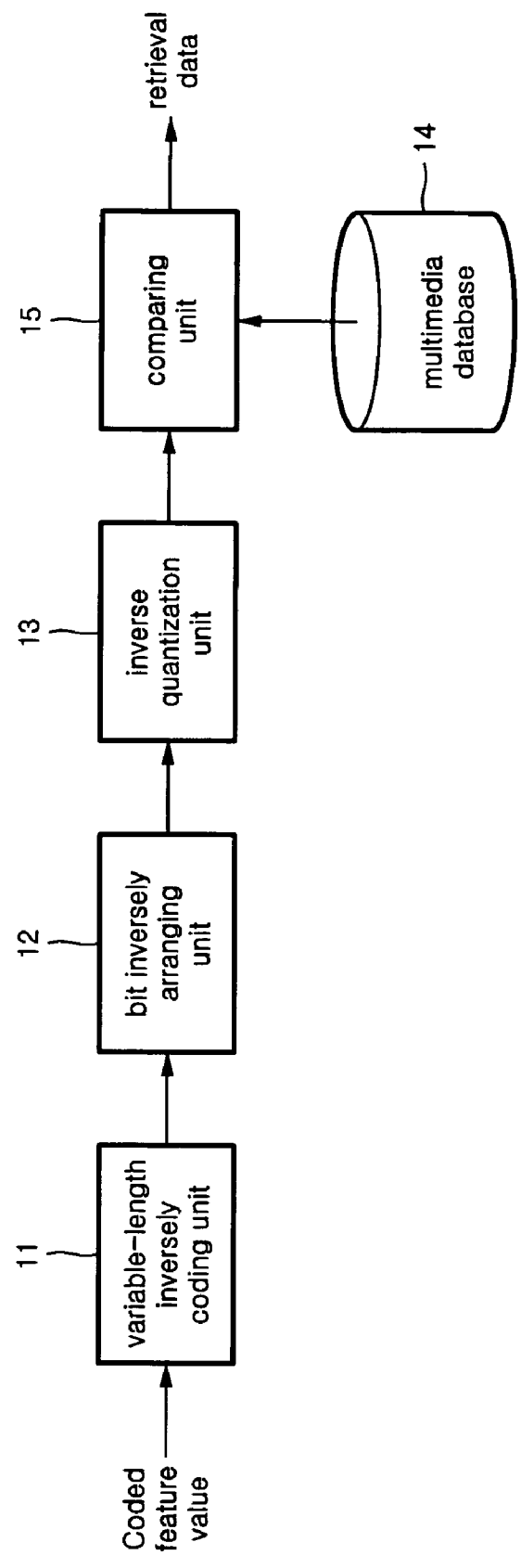
FIG. 4 is a block diagram of a preferred embodiment of a multimedia data retrieval device using the vector descriptor representing apparatus according to the present invention.

FIG. 4 shows a block diagram of a device for vector descriptor representation and multimedia data retrieval according to the present invention.

As shown in FIG. 4, the device for vector descriptor representation and multimedia data retrieval according to the present invention includes a variable-length inversely coding unit 11 inversely coding the coded feature values in variable length, a bit inversely arranging unit 12 for rearranging the feature value inversely coded in the variable-length inversely coding unit 11 to original vector descriptor, an inverse quantization unit 13 for inversely quantizing feature values inversely arranged in the bit inversely arranging unit 12, and a comparing unit 15 for comparing the feature values inversely quantized in the inverse quantization unit 13 with multimedia data stored in the multimedia database 14 and outputting retrieval data according to the compared result.

Figure 8:
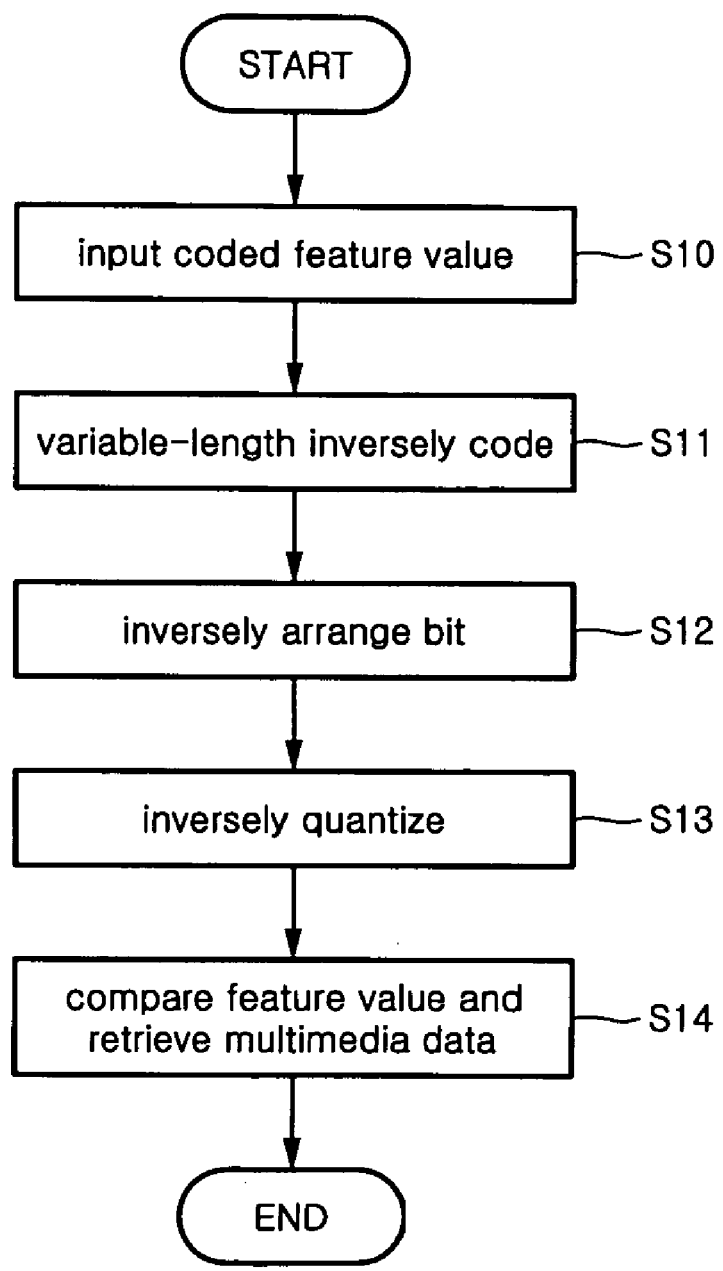
FIG. 8 is a flow chart showing a preferred embodiment of a method for retrieving multimedia data using the vector descriptor representing method according to the present invention.

Referring to FIG. 8, the operation of the device for vector descriptor representation and multimedia data retrieval according to the present invention having the above structure will be described in more detail as follows.

First, in a step S10, if the coded feature values are input in the variable-length inversely coding unit 11, the variable-length inversely coding unit 11 inversely codes the input feature values and restores the hierarchical vector descriptor (Y).

In a step S12, the bit inversely arranging unit 12 inversely arranges the hierarchical vector descriptor (Y) restored in the variable-length inversely coding unit 11 and generates feature values, which are represented in the form of bit, of the vector descriptor (X).

In a step S13, the inverse quantization unit 13 inversely quantizes the plural feature values, which are represented in the form of bit, generated in the bit inversely arranging unit 12 and generates original feature values.

In a step S14, the comparing unit 15 compares the feature values generated in the inverse quantization unit 13 with feature values stored in the multimedia database 14 and outputs retrieval data according to the compared result.

Like the above, multimedia data is retrieved by the feature values restored according to the number of the feature values stored in the feature value storing unit 10, and thereby progressive multimedia data retrieval becomes possible.

Figure 5:
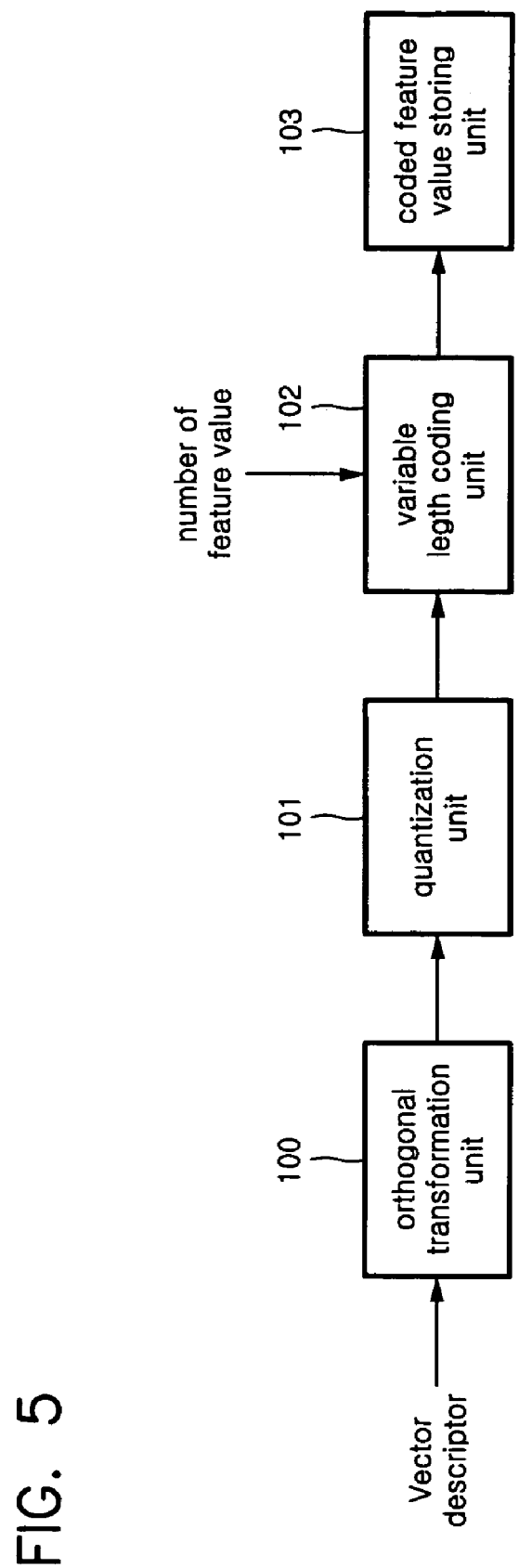
FIG. 5 is a block diagram of another embodiment of the vector descriptor representing apparatus according to the present invention.

FIG. 5 shows a block diagram of the vector descriptor representing apparatus according to the present invention.

As shown in FIG. 5, the vector descriptor representing apparatus according to the present invention includes an orthogonal transformation unit 100 for orthogonally transforming feature vectors constituting the vector descriptor and for representing feature vectors from low frequency feature to high frequency feature, a quantization unit 101 for quantizing the feature values represented in the orthogonal transformation unit 100, and a variable-length coding unit 102 for coding the number of feature values input and feature vectors quantized in the quantization unit 101 and storing the coded feature values in the feature value storing unit 103.

The orthogonal transformation in the orthogonal transformation unit 100 uses DCT (Descrete Cosine Transform), DST (Discrete Sine Transform), DFT (Discrete Fourier Transform), Haar or Wavelet.

Figure 9:
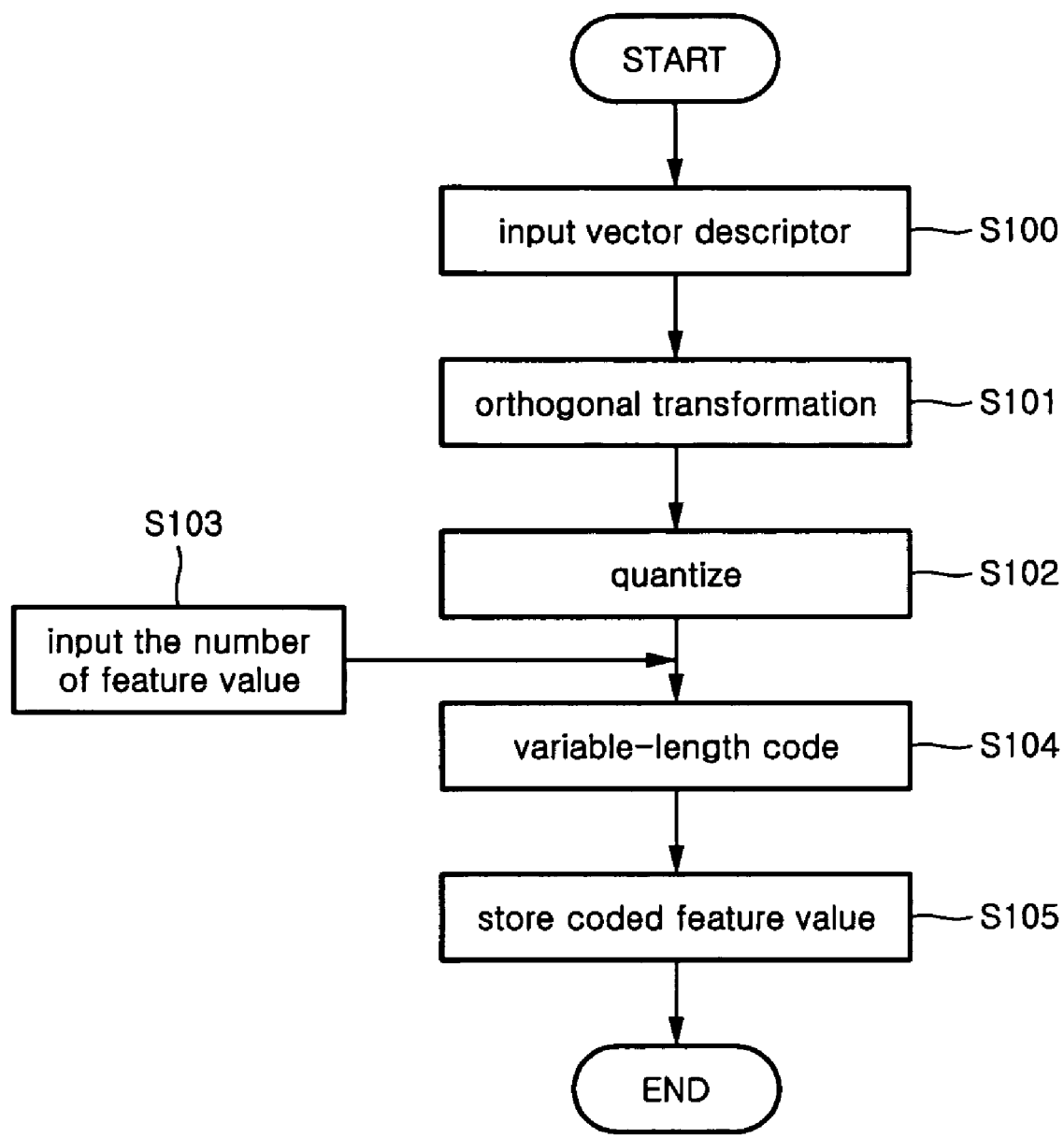
FIG. 9 is a flow chart showing another preferred embodiment of a method for representing vector descriptor according to the present invention.

Referring to FIG. 9, the operation of the vector descriptor representing apparatus according to the present invention will be described in more detail as follows.

First, in a step S100, if the vector descriptor is input in the orthogonal transformation unit 100, the orthogonal transformation unit 100 performs orthogonal transformation such as DCT, DST, DFT, Haar or Wavelet to the input vector descriptor and represents feature values from low frequency feature to high frequency feature.

In a step S102, the quantization unit 101 quantizes feature values represented by the orthogonal transformation unit 100.

In a step S104, the variable-length coding unit 102 performs variable-length coding to feature values represented in the quantization unit 101 with the number of feature values input in the step S103 and stores the coded feature values in the feature value storing unit 103.

Figure 6:
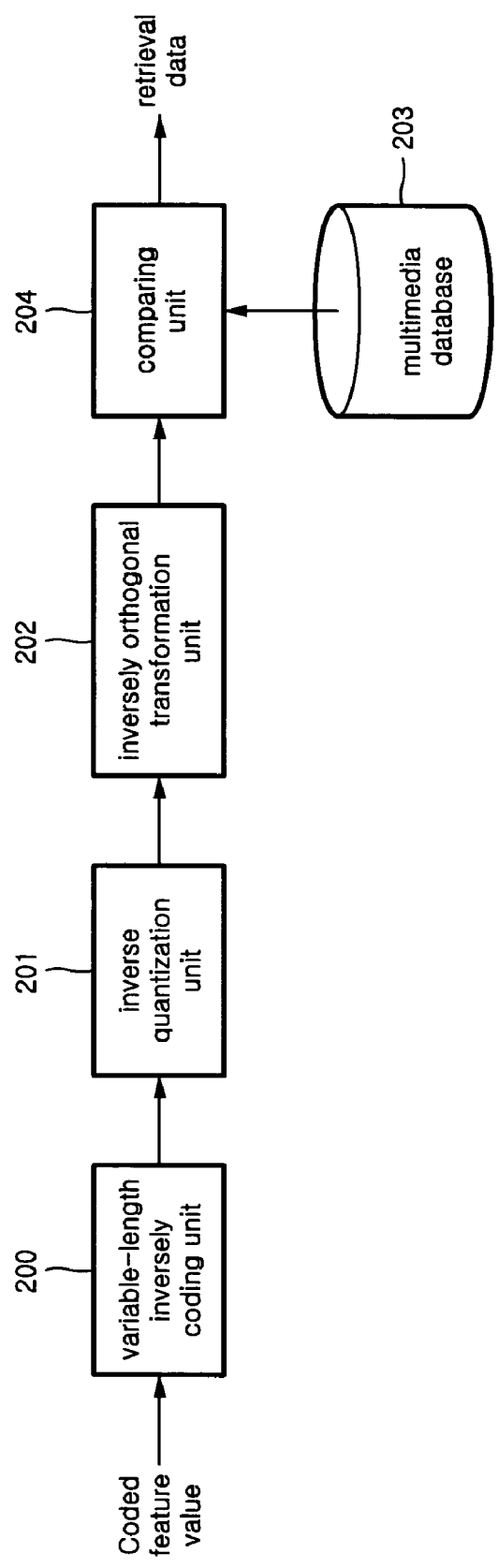
FIG. 6 is a block diagram of another embodiment of the multimedia data retrieval device using the vector descriptor representing apparatus according to the present invention.

FIG. 6 shows a block diagram of another embodiment of the device for vector descriptor representation and multimedia data retrieval according to the present invention.

As shown in FIG. 6, the device for vector descriptor representation and multimedia data retrieval according to the second embodiment of the present invention includes a variable-length inversely coding unit 200 for inversely coding coded feature values in variable length, an inverse quantization unit 201 for inversely quantizing the feature values inversely coded in the variable-length inversely coding unit 200, an inversely orthogonal transformation unit 202 for inversely and orthogonally transforming the inversely quantized feature values and restoring to original feature values, and a comparing unit 204 for comparing the feature values restored in the inversely orthogonal transformation unit 202 with feature values stored in the multimedia database 203 and outputting retrieval data according to the compared result.

The inversely orthogonal transformation in the inversely orthogonal transformation unit 202 uses inverse DCT, inverse DST, inverse DFT, inverse Haar or inverse Wavelet.

Figure 10:
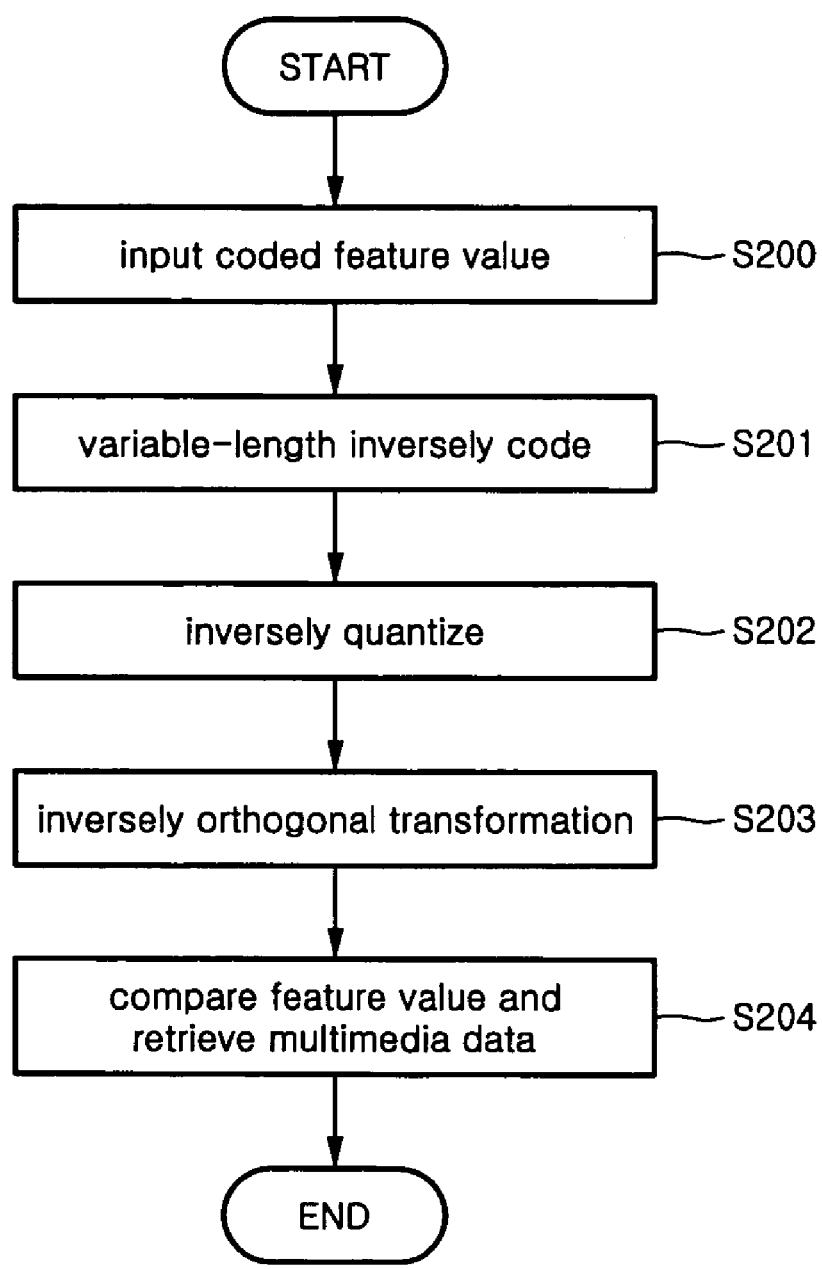
FIG. 10 is a flow chart showing another preferred embodiment of a method for retrieving multimedia data using the vector descriptor representing method according to the present invention.

Referring to FIG. 10, the operation of the device for vector descriptor representation and multimedia data retrieval according to the second embodiment of the present invention will be described in more detail as follows.

First, in a step S200, if the coded feature values are input in the variable-length inversely coding unit 200, the variable-length inversely coding unit 200 inversely codes the coded feature values in a step S201. Here, the coded feature value includes feature values and the number of the feature values.

In a step S202, the inverse quantization unit 201 inversely quantizes the feature values inversely coded in the variable-length inversely coding unit 200.

In a step S203, the inversely orthogonal transformation unit 202 performs inversely orthogonal transformation to the feature values inversely quantized in the inverse quantization unit 201 using inverse DCT, inverse DST, inverse DFT, inverse Haar or inverse Wavelet to restore feature values of original vector descriptor.

In a step S204, the comparing unit 204 compares the feature values restored in the inversely orthogonal transformation unit 202 with feature values stored in the multimedia database 203 and outputs retrieval data according to the compared result.

Like the above, multimedia data is retrieved by the feature values restored according to the number of the coded feature values, and thereby progressive multimedia data retrieval becomes possible.

As previously described, according to the preferred embodiments of the present invention, importance of each feature value can be determined to represent multimedia data using a small amount of data.

Furthermore, the vector descriptor of multimedia data can be represented in multi-stage to retrieve important data progressively.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for vector descriptor representation and multimedia data retrieval, the method comprising:
   an orthogonal transformation step of orthogonally transforming feature values described by a vector descriptor;
   a feature value representation step of representing the transformed feature values from low frequency feature to high frequency feature;
   a quantization step of quantizing the feature values represented in the feature value representation step;
   a variable-length coding step of variable-length coding and storing the quantized feature values and the number of feature values which are input;
   a variable-length inversely coding step of extracting the feature values corresponding to the number of the feature values of the stored feature values and inversely coding the extracted feature values;
   an inverse quantization step of inversely quantizing the feature values inversely coded;
   an inversely orthogonal transformation step of inversely and orthogonally transforming the inversely quantized feature values and restoring to original feature; and
   a comparison step of comparing the restored feature values with feature values stored in a multimedia database and retrieving multimedia data.

2. The method as claimed in claim 1, wherein the orthogonal transformation in the orthogonal transformation step uses DCT (Descrete Cosine Transform).

3. The method as claimed in claim 1, wherein the orthogonal transformation in the orthogonal transformation step uses DST (Discrete Sine Transform).

4. The method as claimed in claim 1, wherein the orthogonal transformation in the orthogonal transformation step uses DFT (Discrete Fourier Transform).

5. The method as claimed in claim 1, wherein the orthogonal transformation in the orthogonal transformation step uses Haar.

6. The method as claimed in claim 1, wherein the orthogonal transformation in the orthogonal transformation step uses Wavelet.

7. The method as claimed in claim 1, wherein the inversely orthogonal transformation in the inversely orthogonal transformation step uses inverse DCT.

8. The method as claimed in claim 1, wherein the inversely orthogonal transformation in the inversely orthogonal transformation step uses inverse DST.

9. The method as claimed in claim 1, wherein the inversely orthogonal transformation in the inversely orthogonal transformation step uses inverse DFT.

10. The method as claimed in claim 1, wherein the inversely orthogonal transformation in the inversely orthogonal transformation step uses inverse Haar.

11. The method as claimed in claim 1, wherein the inversely orthogonal transformation in the inversely orthogonal transformation step uses inverse Wavelet.

12. An apparatus for vector descriptor representation and multimedia data retrieval, the apparatus comprising:
an orthogonal transformation unit for orthogonally transforming feature values described by a vector descriptor;
a feature value representing unit for representing the transformed feature values from low frequency feature to high frequency feature;
a quantization unit for quantizing the feature values represented in the feature value representation step;
a variable-length coding unit for variable-length coding and storing the quantized feature values and the number of the feature values which are input;
a variable-length inversely coding unit for extracting the feature values corresponding to the number of the feature values of the stored feature values and inversely coding the extracted feature values;
an inverse quantization unit for inversely quantizing the feature values inversely coded;
an inversely orthogonal transformation unit for inversely and orthogonally transforming the inversely quantized feature values and restoring to original feature; and
a comparing unit for comparing the restored feature values with feature values stored in a multimedia database and retrieving multimedia data.

13. The apparatus as claimed in claim 12, wherein the orthogonal transformation in the orthogonal transformation unit uses DCT (Descrete Cosine Transform).

14. The apparatus as claimed in claim 12, wherein the orthogonal transformation in the orthogonal transformation unit uses DST (Discrete Sine Transform).

15. The apparatus as claimed in claim 12, wherein the orthogonal transformation in the orthogonal transformation unit uses DFT (Discrete Fourier Transform).

16. The apparatus as claimed in claim 12, wherein the orthogonal transformation in the orthogonal transformation unit uses Haar.

17. The apparatus as claimed in claim 12, wherein the orthogonal transformation in the orthogonal transformation unit uses Wavelet.

18. The apparatus as claimed in claim 12, wherein the inversely orthogonal transformation in the inversely orthogonal transformation unit uses inverse DCT.

19. The apparatus as claimed in claim 12, wherein the inversely orthogonal transformation in the inversely orthogonal transformation unit uses inverse DST.

20. The apparatus as claimed in claim 12, wherein the inversely orthogonal transformation in the inversely orthogonal transformation unit uses inverse DFT.

21. The apparatus as claimed in claim 12, wherein the inversely orthogonal transformation in the inversely orthogonal transformation unit uses inverse Haar.

22. The apparatus as claimed in claim 12, wherein the inversely orthogonal transformation in the inversely orthogonal transformation unit uses inverse Wavelet.

* * * * *